(No Model.) 2 Sheets—Sheet 1.

J. LINNROTH.
CAR BRAKE.

No. 339,670. Patented Apr. 13, 1886.

Witnesses:
O. H. Rowe
H. M. Richards

Inventor:
Joseph Linnroth,
By W. B. Richards,
Att'y.

(No Model.) 2 Sheets—Sheet 2.
J. LINNROTH.
CAR BRAKE.
No. 339,670. Patented Apr. 13, 1886.
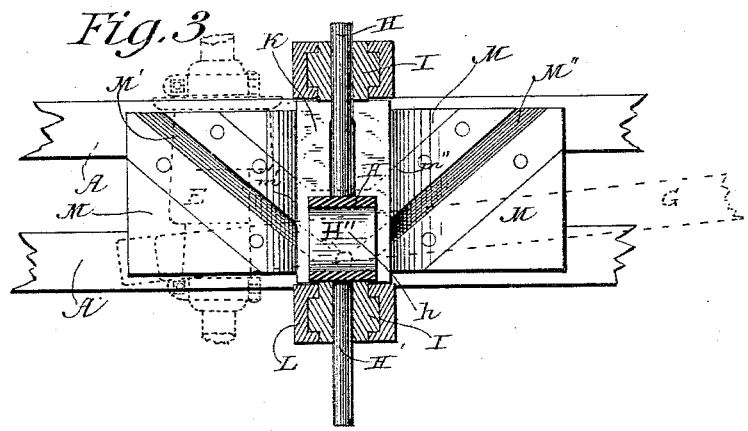
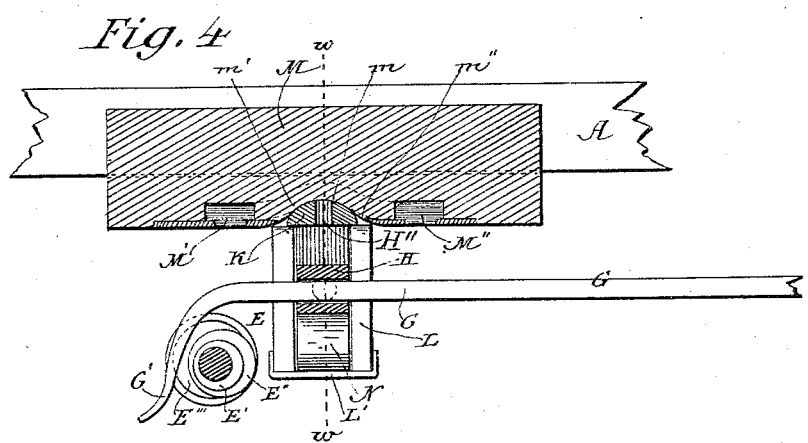
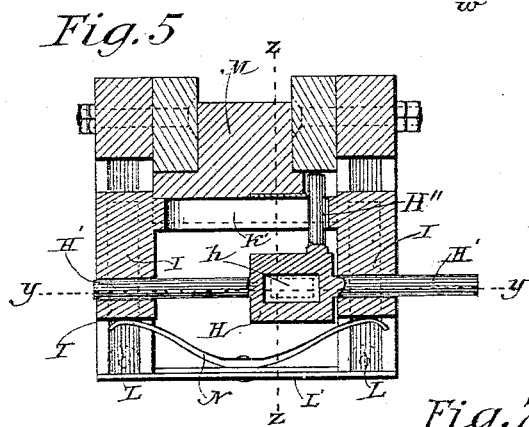
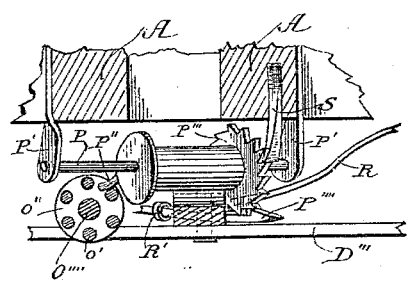
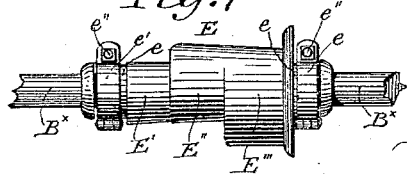
Witnesses:—
Wm. H. Rowe
H. M. Richards
Inventor:
Joseph Linnroth,
By W. B. Richards,
Att'y.
N. PETERS, Photo-Lithographer, Washington, D. C.

UNITED STATES PATENT OFFICE.

JOSEPH LINNROTH, OF GALESBURG, ILLINOIS.

CAR-BRAKE.

SPECIFICATION forming part of Letters Patent No. 339,670, dated April 13, 1886.

Application filed January 2, 1886. Serial No. 187,454. (No model.)

*To all whom it may concern:*

Be it known that I, JOSEPH LINNROTH, a citizen of the United States, residing at Galesburg, in the county of Knox and State of Illinois, have invented certain new and useful Improvements in Railway-Car-Brake Operating Mechanism, of which the following is a specification.

My invention relates to car-brakes actuated by one of the axles of a car, which brakes operate through a system of rods and levers upon the brake-beam to apply the brakes to the wheels by the movement of the car and the rotation of the axle with which said brake mechanism is connected.

In car-brakes heretofore employed the power has been applied by means of devices which will act constantly with unremitting force upon the revolving wheels, and often completely check their revolution before the movement of the train is arrested, and thus cause the wheels to slide upon the rails, thereby damaging and tending to destroy the rails and to flatten the tread of the wheels. When wheels are thus flattened, they act destructively to both the rails and the wheels, and are in a short time unfitted for use.

The object of my invention is to provide a car-brake which will operate by repeated applications of increased and diminished pressure to the tread of the wheels to check, but not completely arrest, their revolution by each impulse until the car is brought to rest, by which means the wheels will not be allowed to slide upon the rails.

The principal features of my invention and its operation are as follows: To one of the axles of the car is attached a cam-eccentric to the axle or series, of eccentric-cams of gradually-increasing diameter, and upon the inner sills of the car-frame is supported an endwise-moving wedge-block, or block with oblique grooves, which operates upon a pull-bar connected with the brake beams to move them into position to be acted upon by the aforesaid cams, by which means the brakes will be applied by successive impulses of increased and diminished force to the tread of the wheels until the movement of the car is arrested without sliding the wheels. A simple means for automatically taking up lost motion in the rods and links connecting the brake-beams by the action of the brake also constitutes a part of my invention.

Figure 1:
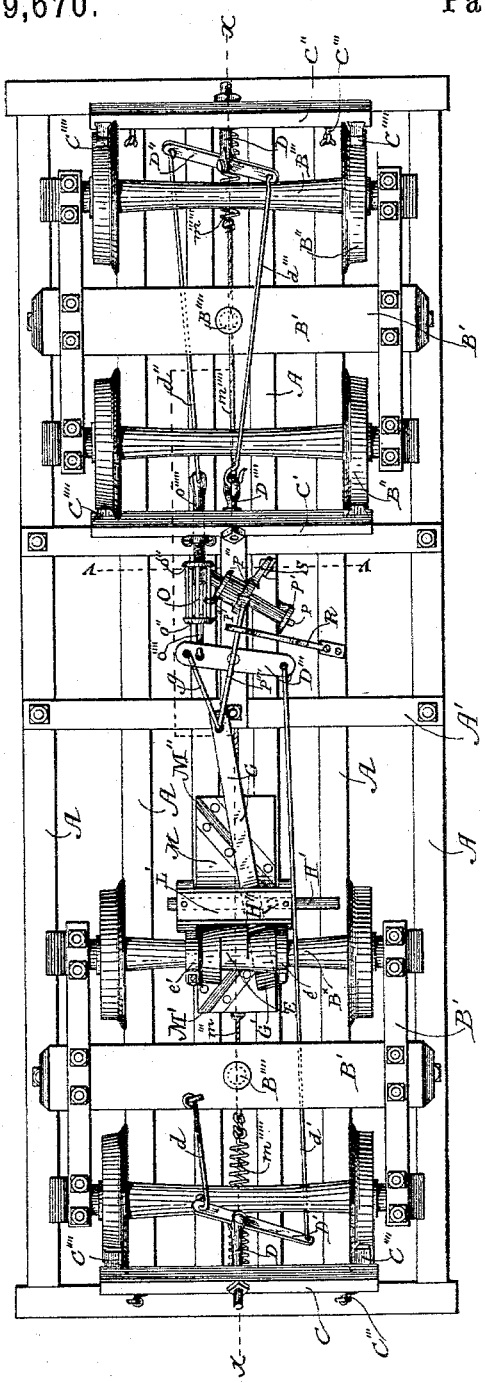
Figure 2:
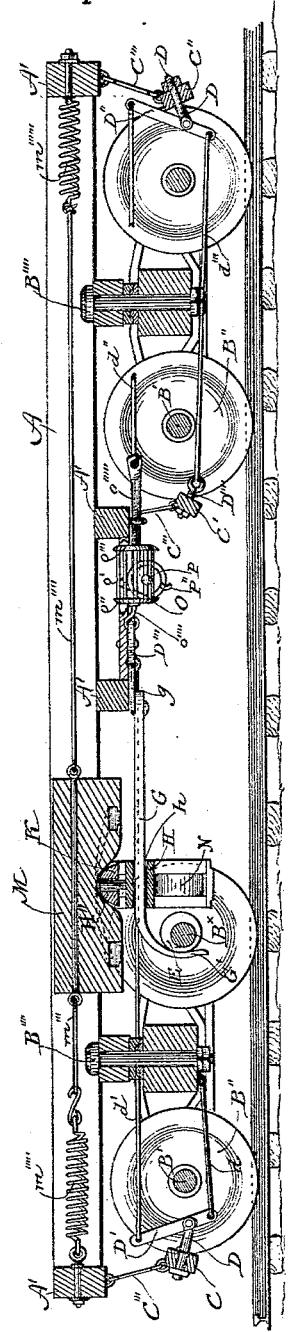

In the accompanying drawings, Figure 1 is a plan of a car inverted, showing one method of applying my automatic brake. Fig. 2 is a vertical sectional elevation of the same in the line $x$ $x$ of Fig. 1. Fig. 3 is an enlarged plan of the wedge-shaped block and its connections inverted and partly in section in the line $y$ $y$ of Fig. 5, and showing the cam and pull-bar in dotted lines. Fig. 4 is an enlarged sectional elevation of the same in the line $z$ $z$ of Fig. 5, showing the cam and pull-bar in full lines. Fig. 5 is an enlarged sectional elevation of the same in the line $w$ $w$ of Fig. 4. Fig. 6 is an enlarged end elevation of the device for taking up slack in the brake-rods and connections, with fragmental parts of the car-frame in section in the line $v$ $v$ of Fig. 1. Fig. 7 is an enlarged plan of the cam for operating the brakes.

My improvements are shown as applied to a brake mechanism of the ordinary form employed upon cars wherein a series of longitudinal sills, A, and cross-girths A' form the frame of the car. The truck-frame B', wheels B'', and axles B''' swing together beneath the ends of the car-frame upon a king-bolt, B'''', and brake-beams C C' C'', suspended by links C''' from the under side of the car-frame to allow said beams to have a limited swinging motion to hold the brake-shoes C'''' at all times against the tread of the truck-wheels. Jaw-bolts D pass through the middle part of the brake-beams, and carry levers D' D'', arranged at opposite ends of the car. The lever D' is connected at one end by a rod, $d$, to the truck-frame, and at the other end by a similar rod, $d'$, to one end of a lever, D''', pivoted midway of its length to the under side of the car-frame. The lever D''' is connected at its other end through a take-up screw-bolt and nut, hereinafter described, and a rod, $d''$, secured thereto, and also secured to one end of the lever D'', above referred to. The other end of the lever D'' is connected by a similar rod, $d'''$, with an eyebolt, D'''', secured to the brake-beam C'.

The mode of connecting up the brake-beams above described is well known, and forms no part of my present invention, except to illustrate one mode of its application.

The operation of the devices above described consists in applying power to the lever D''', which is normally arranged in a transverse position across the under side of the car, to draw it into a diagonal position and draw the rods, which extend to the opposite ends of the car simultaneously, to equalize and distribute the strains upon the several brake-beams which are suspended beneath a single car, and by which means they may be operated upon jointly.

Ordinarily chains and rods are employed to connect the lever D''' with a vertical shaft supported in bearings at the ends of the car-frame, and provided with a brake-wheel, which may be operated by hand in a well-known manner, and such means may be employed as supplemental devices in connection with my invention, if desired.

My present invention is employed for automatically applying power to the brakes by successive impulses imparted by one of the revolving axles of the moving train, and consists in a cam, E, preferably formed in two sections, held together by hinged straps $e'$ $e'$, clamped by screws $e^2$ to the hubs $e$ of the said sections, and securely held thereby upon the inner axle, $B^x$, of one of the trucks. The cam E is preferably formed of a series of spirally-arranged cams E' E'' E''', of successively-increasing throw or diameter, as shown in Fig. 7. A pull-bar, G, is suspended beneath the car-frame, and is provided with a crooked depending end, G', which is raised and lowered to be brought in contact with the surfaces of the cam E, and is moved laterally to slide progressively from one to the other of the cams E' E'' E''', the higher side of each of said cam-surface, being connected with or joined to the lower side of the next larger and adjacent cam-surface, to admit of the unobstructed movement of the hooked end of the pull-bar from one end to the other of the cam-surfaces, as will appear by reference to said Fig. 7.

The pull-bar G is connected by a link, $g$, with the lever D''', and when the cams act on the crooked end of the pull-bar and move said bar endwise the brakes will be set and released by a series of impulses received from the cams. The crooked end of the pull-bar G is supported in a carrier-block, H, formed with a slot, $h$, through which the said bar passes, and is provided with guide-rods H', supported to move endwise in bearings I, projecting downwardly from a pillow-block, K, and adapted to move vertically in guides L L, secured to and depending from the sills A of the frame. An endwise-moving wedge-block, M, supported to move freely between the longitudinal frame sills and above the pillow-block K, is provided with grooves M' M'', diverging from the middle portion to the ends of the wedge-block, and a pin, H'', secured to the upper side of the carrier-block H, passes through a slot, K', in the pillow-block, and into the grooves M' M'' of the wedge-block, and is pushed from side to side by said grooves to swing the crooked end of the pull-bar lengthwise of the axle B, across the cam-surfaces E' E'' E'''. The under surface of the wedge-block is formed with a central and laterally-arranged depression, $m$, into which the pillow-block K snugly fits, and is also formed with curved or waved contours $m'$ $m''$, extending from the bottom of said depression toward the respective ends and flat under surface of the wedge-block, as shown in Fig. 4, and a spring-plate, N, is supported upon the cross-brace L' of the guides L L, to press upon the bearings I of the pillow-block and hold it at all times in close contact with the undulating surface of the wedge-block, by which means the pillow-block, carrier-block, and swinging crooked end of the pull-bar may be raised and lowered to be moved into and out of contact with the cam E by the endwise movement of the wedge-block in either direction. The endwise movement of the wedge-block is effected in this instance by cords $m'''$ $m''''$, which connect the ends of said block respectively with coiled springs $m'''''$ $m''''''$, secured to the ends of the car-frame, and the ends of the cords $m''''$ $m''''$ may be passed over pulleys to any place upon the car within convenient reach. The wedge-block may be thus easily operated by hand in either direction to move the pull-bar into working position, and may be acted upon by the coiled springs $m'''''$ $m''''''$, to restore the block and pull-bar to their normal positions.

It is obvious that the wedge-block M may be moved endwise in either direction by compressed air, steam, by mechanical, electrical, or other means commonly employed to start or release brake mechanism operated by the movement of the car.

When a series of iron rods or bars are subjected to continued strains, especially such as are brought upon the rods and connections of car-brakes of the form above described, the links, bars, and rods will be slightly extended lengthwise each time that the brakes are operated. Ordinarily the slack due to the elongation of the bars is taken up by screw threads and nuts upon the bolts at certain times when the brakes will be found in practice to need such attention.

In order to automatically take up the slack, a trundle-wheel, O, is interposed between the lever D''' and the end of the rod $d''$, as shown in Figs. 1 and 2 and in detail in Fig. 3 of the drawings. The trundle-wheel is formed of a cluster of circularly-arranged rods $o'$, secured to heads $o''$ $o'''$. The head $o''$ is swiveled or journaled upon the end of the eyebolt $o''''$, secured to the lever D''', and the head $o'''$ is screw-threaded to receive the threaded end of an eyebolt, $o'''''$, the opposite end of which is connected to the rod $d''$, as shown at Figs. 1, 2, and 6. A shaft, P, supported in bearings P', secured to the sills A, carries an arm, P'', which revolves therewith and sweeps across the path of the rods $o'$, to partially revolve the trundle-wheel at each revolution of the shaft P and arm P''. A ratchet-wheel, P''', is also secured to the shaft P, and a hook-ended pawl, P'''', attached loosely to the pull-bar G, is guided and held to move over the teeth of the said ratchet-wheel with a yielding pressure by a spring-rod, R, secured at one end to the frame of the car, and provided at its other end with a loop or eye, R', through which the pawl P'''' passes. A detent, S, secured to one of the car-sills A, also engages with the teeth of the ratchet-wheel P''' to intercept its backward movement. The pawl P'''' reciprocates with each movement of the pull-bar, and moves the ratchet-wheel a partial revolution, a determined number of movements being required to partially revolve the trundle-wheel and take up the lost motion due to the elongation of the rods and to the wearing away of the brake-shoes and connections.

The brake is operated by pulling the wedge-block M in either direction lengthwise of the car. The wedge-block M is normally held by the spring N, with the lateral depression $m$ of the wedge-block in its middle portion opposite the pillow-block K, and with the carrier-block H and pull-bar G held to one side, the latter being held a sufficient distance above the cam E to completely clear it and render the pull-bar inoperative.

When the wedge-block is operated upon from either direction, the pillow-block will be forced downwardly by the undulating cam-shaped surface of the wedge-block until the pull-bar is held within the field of movement of the cam E', and the carrier-block and pull-bar, as greater force is exerted on the wedge-block, will be moved laterally by the inclined grooves of the wedge-block to the full length of the cam, and thus hold and subject the pull-bar, brake-beams, and shoes connected therewith to successive strains of gradually-increasing force exerted by the cam-surfaces E' E'' E''', which are brought to bear successively upon the pull-bar as it is carried from one cam-surface to the other. Each cam E' E'' E''' being eccentric to the axle B, upon which they are mounted, will act with a succession of diminishing and increasing forces on the pull-bar and brake-shoes, the lower side of each cam acting with the lesser force and its higher side with the greater force; hence, if the brakes are drawn with force sufficient to lock the wheels and cause them to slide when the lower side of the cam acts on the pull-bar it (the pull-bar) will yield, and the brakes will thereby be released, enough to cause the wheels again to rotate, and thus prevent them sliding, and this action of the cams will take place whether the pull-bar is in contact with the cam E' or drawn by greater force into contact with the cam E'''. When the wedge-block is drawn back by the springs, or other means employed for so doing, the carrier-block, pull-bar, and pillow-block will be restored to their normal positions by the reverse action of the groove in the wedge-block, and by the pressure of the spring, which lifts the pull-bar above the cam to a sufficient distance to completely clear it and render the pull-bar inoperative.

Some of the advantages claimed for this invention are as follows: It involves no alteration in the construction or method of working the present brakes, either by steam, air, hand, or other preferred means, and may be rendered entirely automatic by appliances well known and heretofore employed in connection with the brake-bars. Each car has an independent brake-operating mechanism of its own, and a train can be made up of a part of the cars fitted up with this apparatus and a part without.

This improvement does not interfere with the operation of the brakes entirely by hand in the usual way, and when operated by my improved means the power required to bring the brake mechanism into operation is so slight that it may be worked by a cord passed over pulleys to any part of the train, and the brakes may be applied to any one of the cars in a train without applying them to the other cars, and the train may be thus checked and stopped upon grades and under all conditions effectively.

I claim as my invention and desire to secure by Letters Patent—

1. In a car-brake, the combination, with the car, of an axle, a cam secured thereto, a longitudinally-reciprocating and laterally-moving pull-bar connected to the brake-beams, and a longitudinally-moving wedge-block adapted to shift the pull-bar laterally into and out of working position, substantially as described.

2. In a car-brake, the combination, with the car, of an axle, a series of gradually-expanding or spiral cams, a longitudinally-reciprocating pull-bar connected to the brake-beams, and a cam-shaped wedge-block for moving the pull-bar both vertically and laterally into and out of its working position, substantially as described.

3. In a car-brake, the combination, with a car, of a cam secured to the axle, a longitudinally-reciprocating and laterally-moving pull-bar connected to the brake-beams, and a wedge-block provided with oppositely-inclined grooves or faces to engage with the pull-bar, and provided with means for moving it from either end of the car in opposite directions, substantially as and for the purpose specified.

4. The combination, with the car, of the cam secured to the axle, the pull-bar connected to the brake-beams, the wedge-block, and a carrier-block supported in bearings to move laterally across the wedge-block and carry the pull-bar, substantially as described.

5. The combination, with the car, of the expanding cam E, secured to the axle, the pull-bar G, connected to the brake-beams and actuated by the expanding cam, the cam-faced wedge-block H, a pillow-block, K, adapted to provide bearings for the guide-rods of the carrier-block, and a spring, N, to hold the pillow-block against the cam-shaped face of the wedge-block, substantially as described.

6. In a car-brake, the combination of the pull-bar, rods, levers, and brake-beams with a trundle-wheel connected between the pull-bar and rods, and a pawl and ratchet actuated by the pull-bar to operate the trundle-wheel, substantially as and for the purpose specified.

7. In a car-brake, the combination of a pull-bar connected to the brake-bars, levers, and beams, with a cam secured to one of the car-axles to impart successive impulses to the pull-bar, and a nut and screw-bolt connected with and automatically operated upon by the pull-bar to take up lost motion in the linked connections, substantially as described.

In testimony whereof I affix my signature in presence of two witnesses.

JOSEPH LINNROTH.

Witnesses:
H. M. RICHARDS,
L. M. RICHARDS.